United States Patent
Yang et al.

(10) Patent No.: US 8,176,497 B2
(45) Date of Patent: May 8, 2012

(54) METHOD TO DYNAMICALLY PROVISION ADDITIONAL COMPUTER RESOURCES TO HANDLE PEAK DATABASE WORKLOADS

(75) Inventors: Kong Yang, Round Rock, TX (US); Ananda C. Sankaran, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 1149 days.

(21) Appl. No.: 12/014,861

(22) Filed: Jan. 16, 2008

(65) Prior Publication Data
US 2009/0183152 A1    Jul. 16, 2009

(51) Int. Cl.
*G06F 15/00* (2006.01)
*G06F 9/40* (2006.01)

(52) U.S. Cl. ........................................ 718/108

(58) Field of Classification Search .................. None
See application file for complete search history.

(56) References Cited

U.S. PATENT DOCUMENTS

| | | | |
|---|---|---|---|
| 6,256,637 B1 | 7/2001 | Venkatesh et al. | |
| 7,299,468 B2 * | 11/2007 | Casey et al. | 718/104 |
| 2001/0047482 A1 * | 11/2001 | Harris et al. | 713/200 |
| 2002/0013802 A1 * | 1/2002 | Mori et al. | 709/1 |
| 2004/0221290 A1 * | 11/2004 | Casey et al. | 718/104 |
| 2006/0069761 A1 | 3/2006 | Singh et al. | |
| 2007/0033578 A1 | 2/2007 | Arnold et al. | |
| 2007/0143753 A1 | 6/2007 | Vasile | |

OTHER PUBLICATIONS

U.S. Appl. No. 11/759,099, filed Jun. 6, 2007.
U.S. Appl. No. 11/514,026, filed Aug. 31, 2006.

* cited by examiner

*Primary Examiner* — Corey S Faherty
(74) *Attorney, Agent, or Firm* — Larson Newman, LLP

(57) ABSTRACT

A method to handle peak database workloads is disclosed. In one form of the disclosure, the method can include requesting resources, receiving virtual-machine information in response to requesting, and allocating first and second portions of a workload according to the virtual-machine information. The method can also include processing the first portion on a virtual machine to generate a first result, processing the second portion on a cloned virtual machine to generate a second result, and aggregating the first and the second results to form a response.

12 Claims, 7 Drawing Sheets

METHOD TO DYNAMICALLY PROVISION ADDITIONAL COMPUTER RESOURCES TO HANDLE PEAK DATABASE WORKLOADS

FIELD OF THE DISCLOSURE

This disclosure relates generally to information handling systems, and relates more particularly to methods to dynamically provision additional computer resources to handle peak database workloads.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

Figure 1:
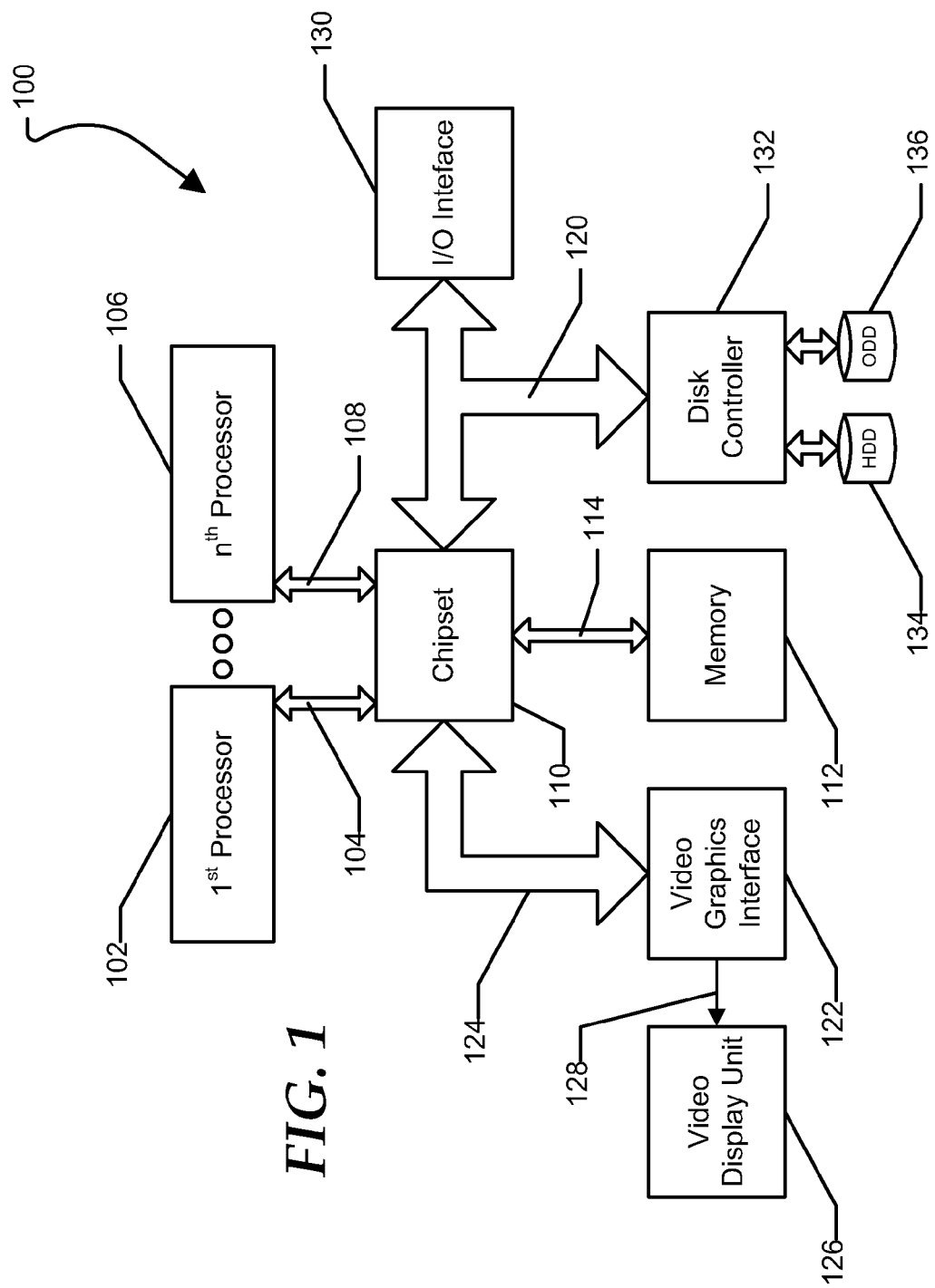
FIG. 1 illustrates a block diagram of an information handling system according to one aspect of the disclosure.

FIG. 1 illustrates a block diagram of an exemplary embodiment of an information handling system, generally designated at 100. In one form, the information handling system 100 can be a computer system such as a server. As shown in FIG. 1, the information handling system 100 can include a first physical processor 102 coupled to a first host bus 104 and can further include additional processors generally designated as $n^{th}$ physical processor 106 coupled to a $n^{th}$ host bus 108. The first physical processor 102 can be coupled to a chipset 110 via the first host bus 104. Further, the $n^{th}$ physical processor 106 can be coupled to the chipset 110 via the $n^{th}$ host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include an Accelerated Hub Architecture (AHA) that uses a dedicated bus to transfer data between first physical processor 102 and the $n^{th}$ physical processor 106. For example, the chipset 110, including an AHA enabled-chipset, can include a memory controller hub and an input/output (I/O) controller hub. As a memory controller hub, the chipset 110 can function to provide access to first physical processor 102 using first bus 104 and $n^{th}$ physical processor 106 using the $n^{th}$ host bus 108. The chipset 110 can also provide a memory interface for accessing memory 112 using a memory bus 114. In a particular embodiment, the buses 104, 108, and 114 can be individual buses or part of the same bus. The chipset 110 can also provide bus control and can handle transfers among the buses 104, 108, and 114. In a particular embodiment, memory 112 includes instructions to manipulate first physical processor 102 or $n^{th}$ physical processor 106, and comprises a computer readable medium.

According to another aspect, the chipset 110 can generally be considered an application specific chipset that provides connectivity to various buses, and integrates other system functions. For example, the chipset 110 can be provided using an Intel® Hub Architecture (IHA) chipset that can also include two parts, a Graphics and AGP Memory Controller Hub (GMCH) and an I/O Controller Hub (ICH). For example, an Intel 820E chipset, an 815E chipset, or any combination thereof, available from the Intel Corporation of Santa Clara, Calif., can provide at least a portion of the chipset 110. The chipset 110 can also be packaged as an application specific integrated circuit (ASIC).

The information handling system 100 can also include a video graphics interface 122 that can be coupled to the chipset 110 using a third host bus 124. In one form, the video graphics interface 122 can be an Accelerated Graphics Port (AGP) interface to display content within a video display unit 126. Other graphics interfaces may also be used. The video graphics interface 122 can provide a video display output 128 to the video display unit 126. The video display unit 126 can include one or more types of video displays such as a flat panel display (FPD) or other type of display device.

The information handling system 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a Peripheral Component Interconnect (PCI) bus or a high speed PCI-Express bus. In one embodiment, a PCI bus can be operated at approximately 66 MHz and a PCI-Express bus can be operated at approximately 128 Mhz. PCI buses and PCI-Express buses can be provided to comply with industry standards for connecting and communicating between various PCI-enabled hardware devices. Other buses can also be provided in association with, or independent of, the I/O bus 120 including, but not limited to, industry standard buses or proprietary buses, such as Industry Standard Architecture (ISA), Small Computer Serial Interface (SCSI), Inter-Integrated Circuit (I²C), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using first bus 104 and the second bus 108 coupled to the n$^{th}$ physical processor 106. The chipset 110 can also include a Southbridge portion (not illustrated) of the chipset 110 and can handle I/O functions of the chipset 110. The Southbridge portion can manage the basic forms of I/O such as Universal Serial Bus (USB), serial I/O, audio outputs, Integrated Drive Electronics (IDE), and ISA I/O for the information handling system 100.

The information handling system 100 can further include a disk controller 132 coupled to the I/O bus 120, and connecting one or more internal disk drives such as a hard disk drive (HDD) 134 and an optical disk drive (ODD) 136 such as a Read/Write Compact Disk (R/W CD), a Read/Write Digital Video Disk (R/W DVD), a Read/Write mini-Digital Video Disk (R/W mini-DVD), or other type of optical disk drive.

Figure 2:
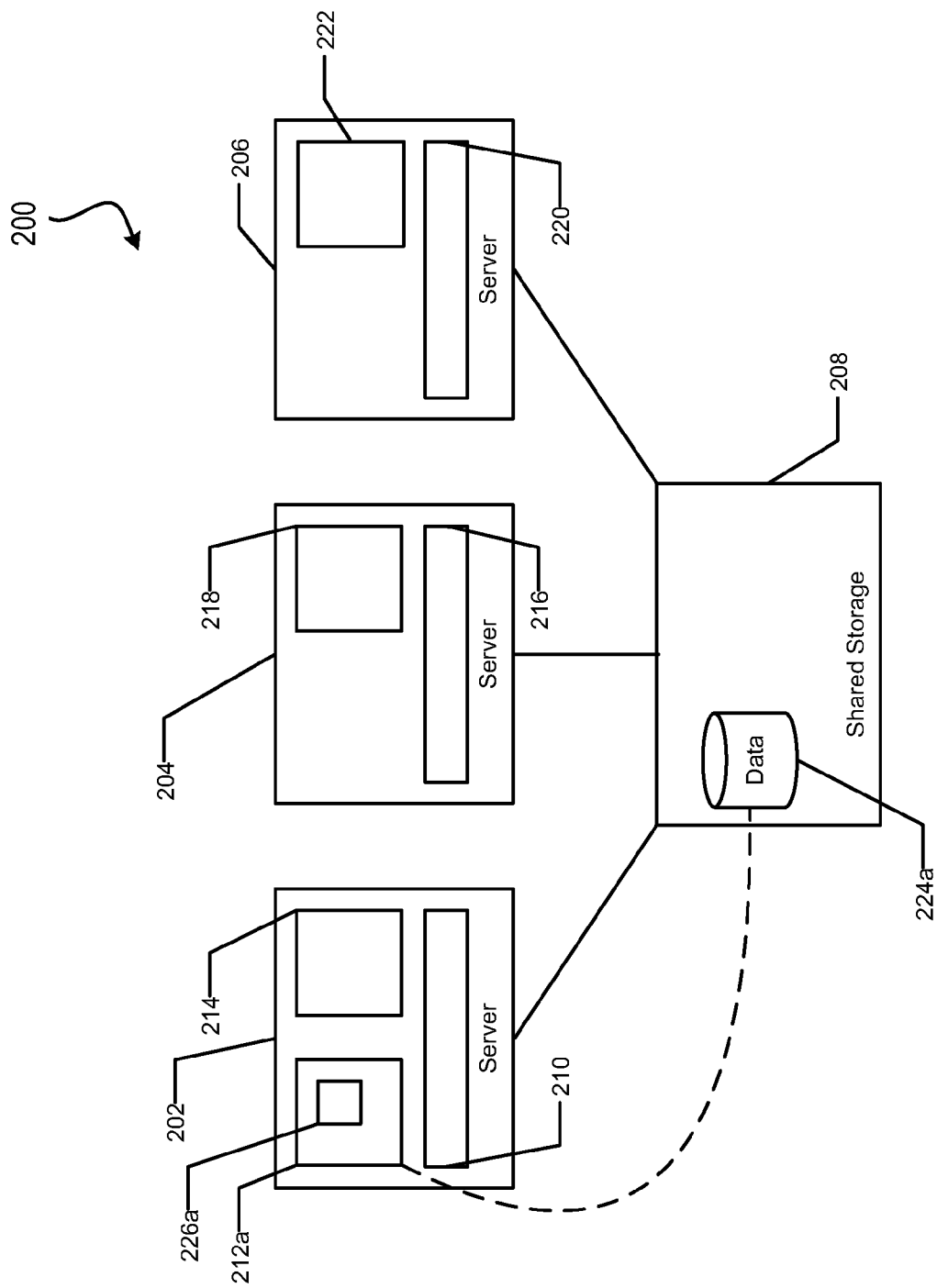
FIGS. 2 through 6 are block diagrams of a server farm according to aspects of the disclosure.

FIG. 2 shows an exemplary embodiment of a server farm 200 comprising a server 202, a server 204, a server 206, and a shared storage 208. The servers 202, 204 and 206, and the shared storage 208 may include information handling systems such as information handling system 100. Shared storage 208 can be a file server, a network attached storage (NAS), or a storage area network (SAN). The server 202 may include a virtualization layer 210, a virtual machine 212a and a virtual machine 214. The server 204 may include a virtualization layer 216 and a virtual machine 218, and the server 206 may include a virtualization layer 220 and a virtual machine 222. The shared storage 208 can be accessible by the virtual machines 212a, 214, 218 and 222. The shared storage 208 can include a data volume 224a assigned to virtual machine 212a. The shared storage 208 can provide additional data volumes (not shown) assigned to virtual machines 214, 218, and 222. The virtual machine 212a can include a database application 226a and the database application 226a can have access to the data volume 224a.

In an exemplary embodiment, the database application 226a can receive a workload. The workload can include one or more queries utilizing one or more tables of one or more databases. The workload can be a read-only workload, such as a business intelligence workload, an online analytical processing (OLAP) workload or a decision support system (DSS) workload. The workload may be a simple workload, such as a small number of queries to a small number of tables. Alternatively, the workload may be a complex workload, such as a large number of queries to a number of large tables. The database application may have the resources, such as CPU time and memory, to process the workload. The database application 226a can access the data volume 224a to retrieve information from a database and process the query workload. The database application may return the results after processing the information from the database.

Alternatively, the database application 226a may not have the resources, such as CPU time or memory, to process the workload. The database application 226a may request additional resources from the virtualization layer 210. If the additional resources are not available on server 202, virtualization layer 210 may communicate with virtualization layers 216 and 220 to locate sufficient resources on other servers 204 and 206. In an embodiment, sufficient resources may be identified on server 204, and virtualization layers 210 and 216 may migrate virtual machine 212 from server 202 to server 204, as illustrated in FIG. 3.

Figure 3:
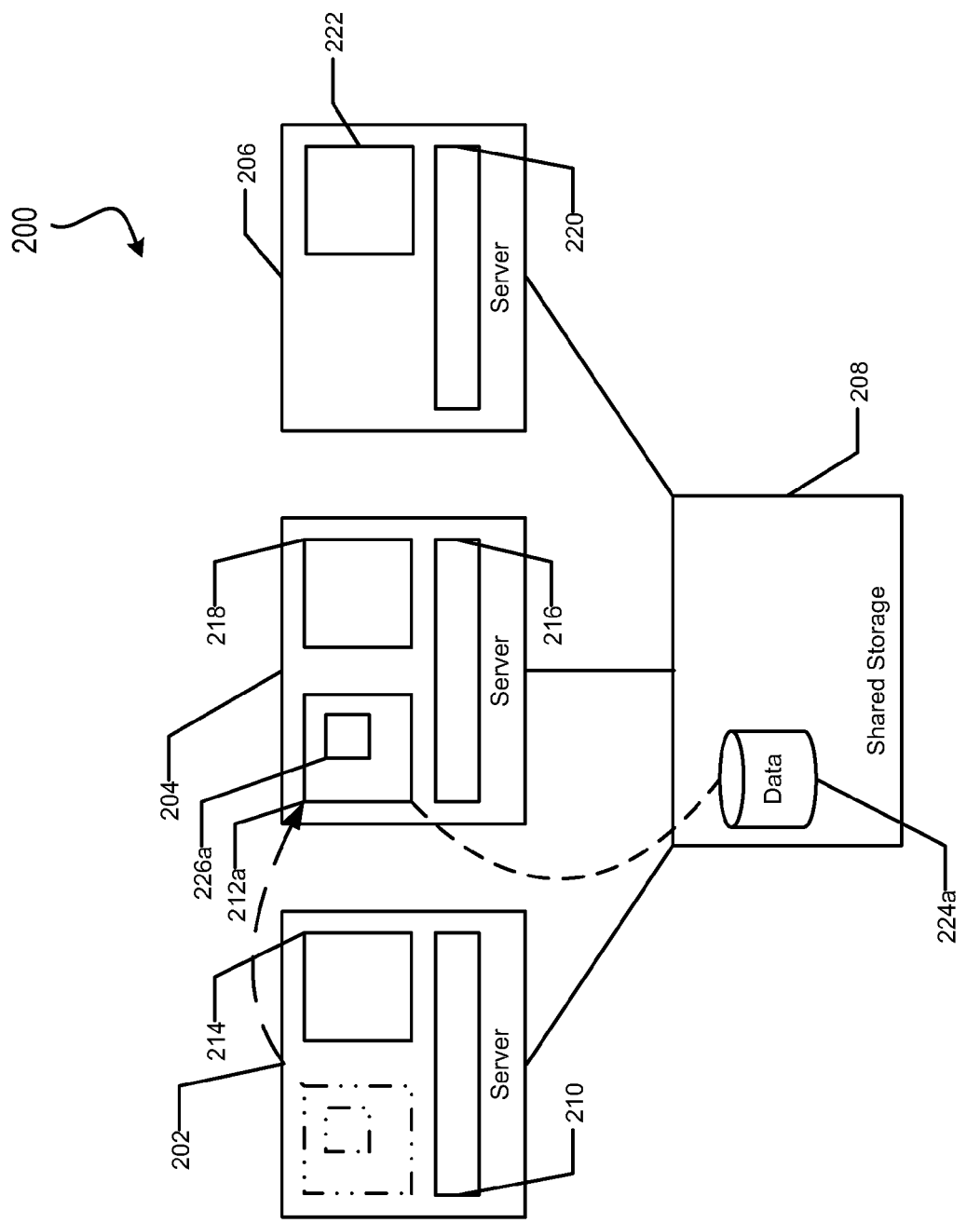

In FIG. 3, virtualization layers 210 and 216 can migrate virtual machine 212a, including database application 226a, from server 202 to server 204. Additionally, the shared storage 208 updates access to the data volume 224a, such that the virtual machine 212a running on the server 204 can access the data volume 224a. The database application 226a can access the data volume 218 to retrieve information from a database. The database application may return the results of the workload after processing the information from the database.

In a further embodiment, the database application 226a may receive a workload that the database application may not have the resources, such as CPU time or memory, to process. The database application 226a may request additional resources from the virtualization layer 210. The virtualization layer 210 may communicate with virtualization layers 216 and 220 to determine if sufficient resources are available on either server 204 or server 206. If sufficient resources are not available on any one of the servers 202, 204 or 206, the database application may utilize multiple virtual machines to process the query in parallel, as shown in FIGS. 4 and 5.

Figure 4:
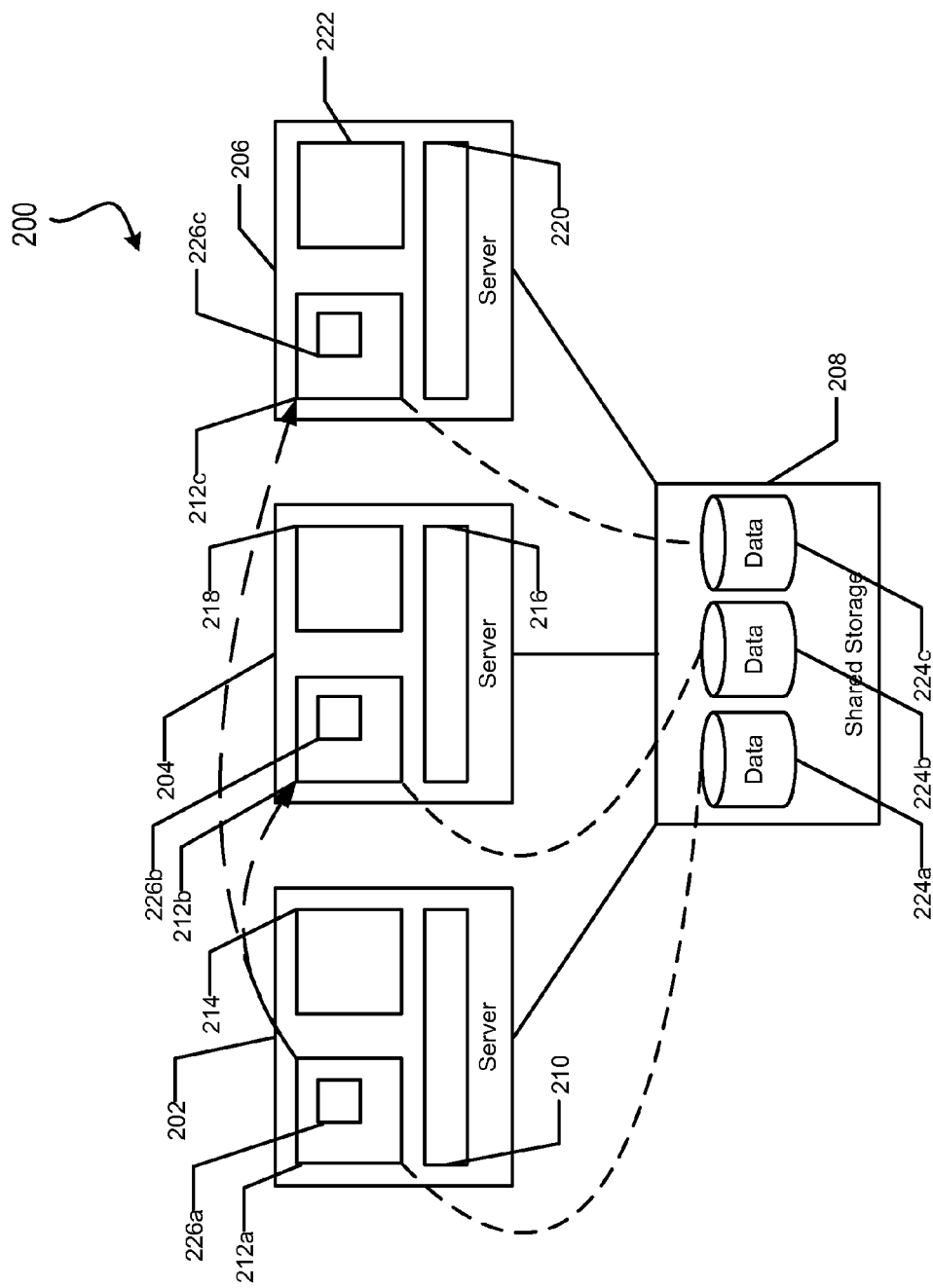

Illustrated in FIG. 4, virtualization layers 216 and 220 may create additional virtual machines 212b and 212c on servers 204 and 206 respectively. The state of virtual machine 212a can be copied to additional virtual machines 212b and 212c, such that virtual machine 212b includes a database application 226b and virtual machine 212c includes a database application 226c. Database applications 226b and 226c can be copies of database application 212a. Additionally, within the shared storage 208, data volume 224a may be cloned as 224b and 224c. Cloning the data volume may include copying the entire data volume, or it may include saving a master data volume and tracking the changes to each of the data volumes 224a, 224b, and 224c. Data volume 224b may be assigned to virtual machine 212b, and data volume 224c may be assigned to virtual machine 212c. Data volume 224b is accessible to database application 226b, and data volume 224c is accessible to database application 226c. Each of the database applications 226a, 226b and 226c may process a portion of the query from the cloned data available in respective data volumes 224a, 224b and 224c and store the result in the same data volumes 224a, 224b, and 224c respectively. The database applications 226a, 226b, and 226c can notify virtualization layers 210, 216, and 220 respectively upon completion of the tasks. Virtualization layers 210, 216, and 220 can assign data volumes 224a, 224b, and 224c to the virtual machine 212a upon completion of the tasks, as shown in FIG. 5.

Figure 5:
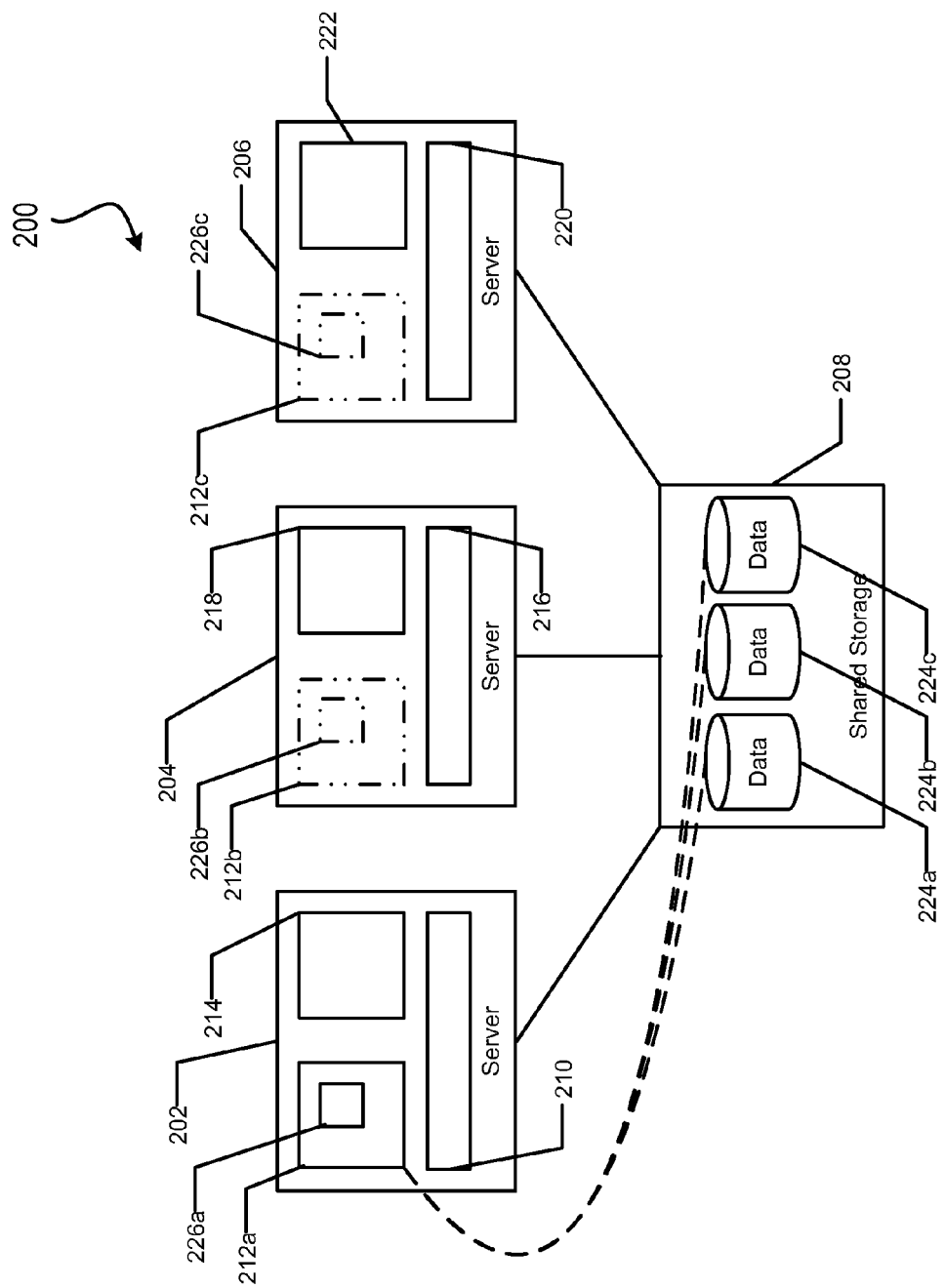
Figure 6:
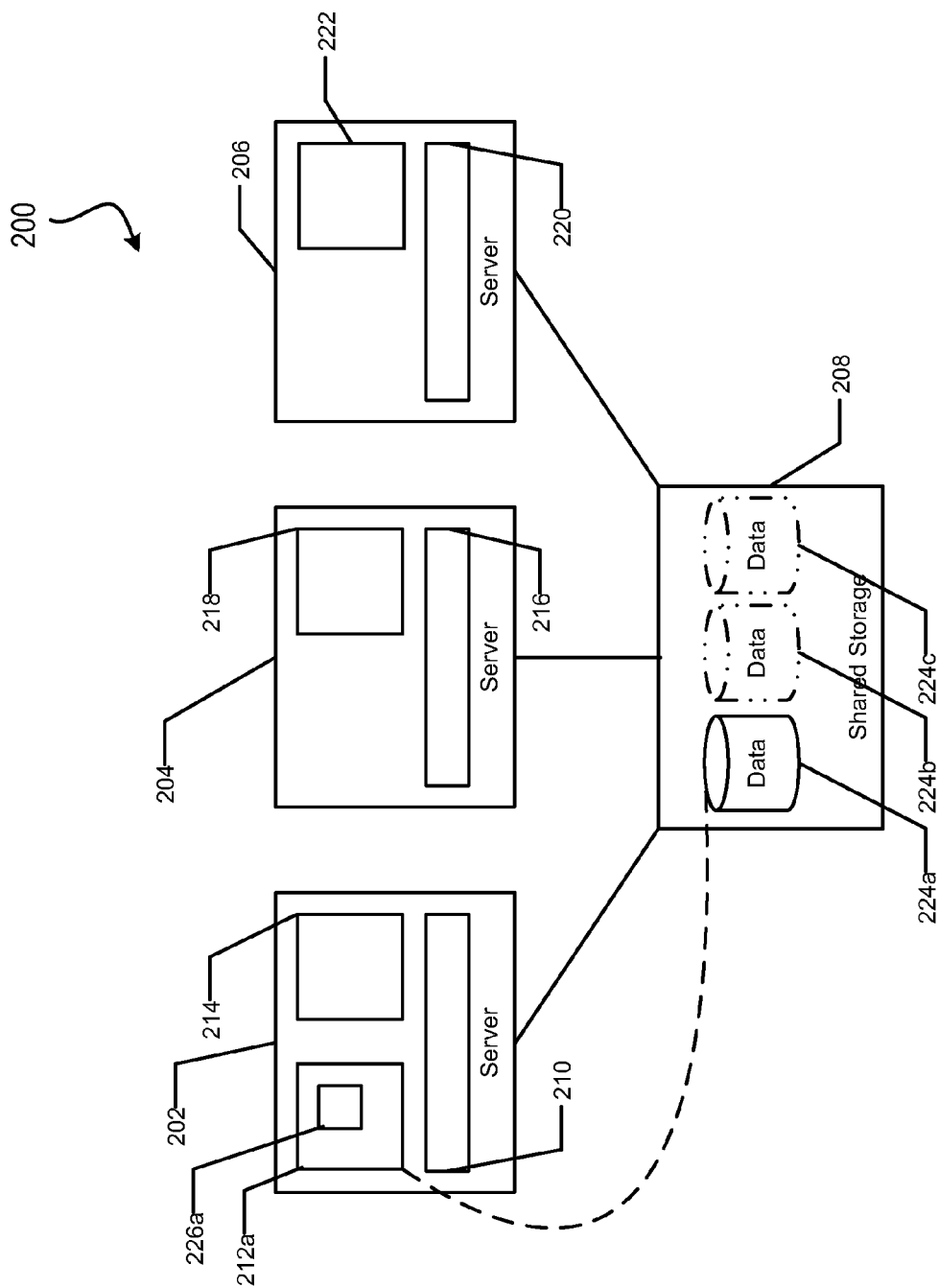

In FIG. 5, data volumes 224b and 224c can be assigned to virtual machine 212a. Additionally, virtualization layers 216 and 220 can decommission virtual machines 212b and 212c. Database application 226a may access data volumes 224a, 224b, and 224c to retrieve the results. The results may be combined to formulate a response to the workload. The shared storage may delete data volumes 224b and 224c after virtual machine 212a has retrieved the results, as shown in FIG. 6.

Figure 7:
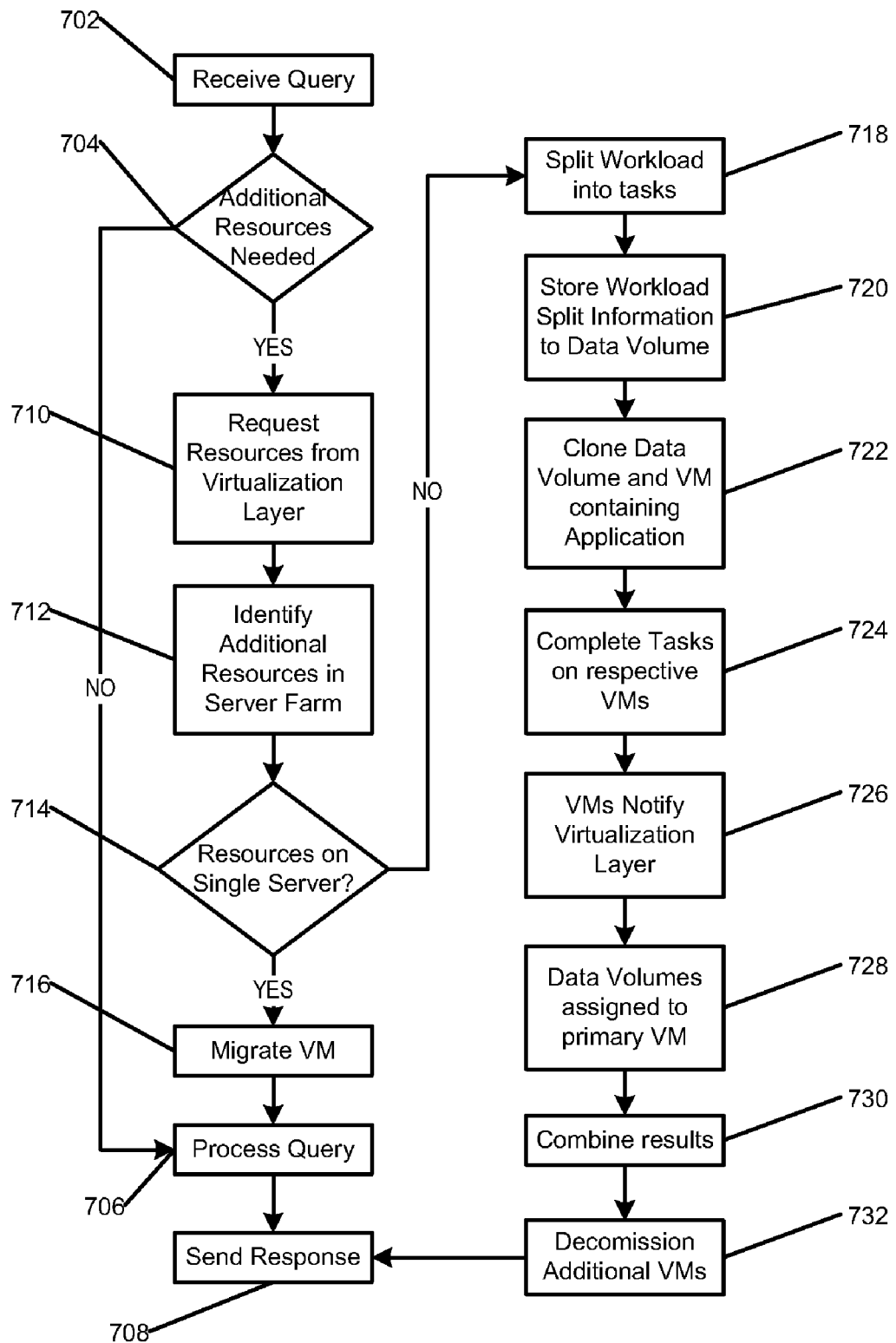
FIG. 7 is a flow diagram for processing a workload according to one aspect of the disclosure.

FIG. 7 is an exemplary embodiment of a method for processing a database workload. At 702, the database application, such as database application 226a, can receive a workload. The workload may be a read only workload, such as a business intelligence workload. For example, the workload may be an online analytical processing (OLAP) workload, a decision support system (DSS) workload, or any combination thereof. At 704, the database application can estimate the resources needed to complete the workload. For example, the resources needed to complete the workload can be estimated based on the number queries and the number of tables accessed. For a large workload, the workload may require additional memory or additional processing power. When the query does not require additional resources, the database application may process the workload, as shown at 706. The database application can send a response to the user at 708.

Alternatively, at 704, when the database application determines additional resources are needed, the database application can request the additional resources from the virtualization layer, as shown at 710. At 712, the virtualization layer can identify additional resources. The resources may be available on one server, or may require multiple virtual machines across multiple servers. At 714, when the additional resources are available on one server, the virtual machine including the database application may be migrated to the server, as shown at 716. The database application may process the workload using the additional resources of the server, as shown at 706. The database application can send a response to the user at 708.

Alternatively, at 714, when the additional resources are not available on one server, the database application may split the workload into tasks, as shown at 718. For example, each virtual machine can be assigned a subset of the queries included in the workload. The tasks can be split based on the resources available to each virtual machine, such that the size of the tasks, i.e., the number and complexity of the queries, are not equivalent. For example, a virtual machine with more processor power may be assigned more queries. Further, a virtual machine with more available memory may be assigned larger queries. Additionally, a complex query can be divided among multiple virtual machines. For example, the complex query may include multiple joins from multiple large tables. Each virtual machine may be assigned one join, or a portion of the records in each table. At 720, the workload split information can be stored in the data volume. The workload information can include the queries and which queries are assigned to each virtual machine. Additionally, a startup plan may be created and written to the data volume. The startup plan may include instructions to identify each additional database application. For example, each database application may be identified based on the IP address of the virtual machine. At 722, the virtualization layer can clone the database application to the additional virtual machines. Additionally, the data volumes can be cloned, such that each additional virtual machine can have access to a cloned data volume. At 724, each database application can complete the assigned task and can write the result to the data volume. At 726, the virtual machines can notify the virtualization layer that the tasks are complete. The data volumes associated with the additional virtual machines can be assigned to the primary virtual machine, as shown at 728. The primary virtual machine can combine the results from the additional virtual machines, as shown at 730. Specifically, the results can be read from the data volumes and aggregated to create a response. At 732, the virtualization layer can decommission the additional virtual machines, freeing the resources on the additional servers. Additionally, the cloned data volumes can be removed. At 708, the response can be sent to the user.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method to handle peak database workloads, comprising:
   requesting resources;
   receiving virtual-machine information in response to requesting;
   allocating first and second portions of a workload according to the virtual-machine information;
   processing the first portion on a virtual machine to generate a first result;
   creating a cloned virtual machine with a virtualization layer;
   cloning with the virtualization layer a storage allocated to the virtual machine to create a cloned storage and allocating the cloned storage to the cloned virtual machine;
   processing the second portion on the cloned virtual machine to generate a second result;
   allocating with the virtualization layer the cloned storage to the virtual machine after processing the second portion; and
   aggregating the first and the second results to form a response.

2. The method of claim 1, further comprising receiving a query and providing the response.

3. The method of claim 1, wherein the virtual-machine information includes a resource listing for the cloned virtual machine.

4. The method of claim 3, wherein the second portion is sized according to the resource listing.

5. The method of claim 1, wherein aggregating includes reading the second result from the cloned storage.

6. An information handling system, the system comprising:
   a plurality of nodes;

a virtualization layer managing compute resources across the plurality of nodes; and a database application operating within a first virtual machine, the first virtual machine running on one of the plurality of nodes, the database application configured to:

request resources from the virtualization layer;

receive virtual-machine information from the virtualization layer in response to requesting;

allocate a first and a second portions of a workload according to the virtual-machine information;

cause the virtualization layer to create a cloned virtual machine on a second node of the plurality of nodes, wherein the second node comprises a second information handling system;

process the first portion on the first virtual machine to generate a first result;

process the second portion on the cloned virtual machine to generate a second result; and aggregating the first and the second results;

wherein the database application is further configured to cause a virtualizations layer to create the cloned virtual machine, wherein the database application is further configured to cause a virtualizations layer to clone a storage allocated to the first virtual machine to create a cloned storage and allocating the cloned storage to the cloned virtual machine, wherein the database application is further configured to cause the virtualization layer to allocate the cloned storage to the first virtual machine after processing the second portion.

7. The information handling system of claim 6, wherein the database application is further configured to receive a query and providing the response.

8. The information handling system of claim 6, wherein the first virtual machine information includes a resource listing for the cloned virtual machine.

9. The information handling system of claim 8, wherein the second portion is sized according to the resource listing.

10. The information handling system of claim 6, wherein aggregating includes reading the second result from the cloned storage.

11. The method of claim 5, further comprising deleting the cloned storage with the virtualization layer after aggregating.

12. The information handling system of claim 10, wherein the database application is further configured to delete the cloned storage after aggregating.

* * * * *